(12) United States Patent
Strzala (10) Patent No.: US 12,523,270 B2
(45) Date of Patent: Jan. 13, 2026

(54) BRAKE CALIPER, WEAR INDICATION DEVICE, AND VEHICLE BRAKE

(71) Applicant: ZF CV Systems Europe BV, Brussels (BE)

(72) Inventor: Wieslaw Strzala, Byczyna (PL)

(73) Assignee: ZF CV Systems Europe BV, Brussels (BE)

( * ) Notice: Subject to any disclaimer, the term of this patent is extended or adjusted under 35 U.S.C. 154(b) by 350 days.

(21) Appl. No.: 18/123,389

(22) Filed: Mar. 20, 2023

(65) Prior Publication Data

US 2023/0304554 A1 Sep. 28, 2023

(30) Foreign Application Priority Data

Mar. 23, 2022 (EP) ..................................... 22163778

(51) Int. Cl.
*F16D 66/02* (2006.01)
*F16D 65/00* (2006.01)

(52) U.S. Cl.
CPC ....... *F16D 66/024* (2013.01); *F16D 65/0068* (2013.01)

(58) Field of Classification Search
CPC .............................. F16D 66/024; F16D 66/022
USPC ...................................................... 188/1.11 L
See application file for complete search history.

(56) References Cited

U.S. PATENT DOCUMENTS

| | | | |
|---|---|---|---|
| 3,675,197 A | | 7/1972 | Bennett et al. |
| 3,783,979 A | * | 1/1974 | Hess ..................... F16D 66/024 188/1.11 R |
| 3,882,448 A | * | 5/1975 | Shibatani ............... F16D 66/024 200/61.4 |
| 4,085,827 A | | 4/1978 | Kestermeier |
| 4,318,457 A | * | 3/1982 | Dorsch .................. F16D 66/024 340/454 |
| 4,742,326 A | | 5/1988 | Gregoire et al. |
| 4,832,160 A | * | 5/1989 | Fargier .................. F16D 66/024 188/1.11 L |
| 4,890,697 A | * | 1/1990 | Fischer ................. F16D 66/027 340/454 |
| 5,133,431 A | * | 7/1992 | Braun .................... F16D 66/024 188/1.11 L |

(Continued)

FOREIGN PATENT DOCUMENTS

DE 2743868 A1 4/1978
EP 0093657 A1 11/1983
(Continued)

*Primary Examiner* — Bradley T King
(74) *Attorney, Agent, or Firm* — Dickinson Wright PLLC (57) ABSTRACT

A brake caliper (10) for a vehicle brake (1) includes a brake pad (100), having a friction lining (120) and a brake pad carrier (140) configured to carry the friction lining (120), and a wear indication device (200) having a fixation device (210) and a signal wire (220). The signal wire (220) includes a looped portion (222), and the fixation device (210) has a front part (214), a back part (216), and a bridge (217) connecting the front part (214) and the back part (216). The looped portion (222) of the signal wire (220) is at least partly arranged externally on the front part (214) and projects towards a contact surface (121) of the friction lining (120). A hook (226) extends from the back part (216) of the fixation device (210) and engages with said looped portion (222).

18 Claims, 7 Drawing Sheets

(56) References Cited

U.S. PATENT DOCUMENTS

| | | | | |
|---|---|---|---|---|
| 6,158,275 | A * | 12/2000 | Asao | F16D 66/024 |
| | | | | 73/121 |
| 6,179,091 | B1 * | 1/2001 | Takanashi | F16D 66/024 |
| | | | | 188/1.11 L |
| 6,290,027 | B1 * | 9/2001 | Matsuzaki | F16D 66/024 |
| | | | | 188/1.11 E |
| 6,338,397 | B1 * | 1/2002 | Gezgin | B60T 17/221 |
| | | | | 188/1.11 E |
| 6,345,700 | B1 * | 2/2002 | Zenzen | F16D 66/024 |
| | | | | 188/1.11 E |
| 2014/0245824 | A1 * | 9/2014 | Bosis | B60T 17/18 |
| | | | | 73/129 |
| 2015/0362028 | A1 | 12/2015 | Sander et al. | |
| 2015/0369318 | A1 | 12/2015 | Kang | |
| 2019/0032739 | A1 | 1/2019 | Krause et al. | |
| 2019/0309813 | A1 * | 10/2019 | Isshiki | F16D 65/183 |
| 2021/0115990 | A1 | 4/2021 | Strzala | |
| 2022/0106995 | A1 * | 4/2022 | Strzala | F16D 66/024 |
| 2025/0116306 | A1 * | 4/2025 | Valldeoriola Morales | |
| | | | | F16D 66/027 |

FOREIGN PATENT DOCUMENTS

| | | | |
|---|---|---|---|
| FR | 2617257 A1 | 12/1988 | |
| GB | 2029528 A | 3/1980 | |
| GB | 2351537 A | 1/2001 | |

\* cited by examiner

BRAKE CALIPER, WEAR INDICATION DEVICE, AND VEHICLE BRAKE

FIELD

The invention relates to a brake caliper for a vehicle brake, in particular for a disc brake of a commercial vehicle, the brake caliper including a brake pad having a friction lining and a brake pad carrier configured to carry the friction lining proximate to a brake disc of the vehicle brake. More particularly, the friction lining has a contact surface facing away from the brake pad carrier that is configured to bear against the brake disc of the vehicle brake during braking, wherein the brake pad carrier has a carrier plane facing towards the friction lining and a rear plane opposite to the carrier plane, and the brake caliper includes a wear indication device having a fixation device and a signal wire including a looped portion, wherein the fixation device has a front part engaging the carrier plane, a back part engaging the rear plane, and a bridge connecting the front part and the back part, wherein the looped portion of the signal wire is at least partly arranged externally on the front part of the wear indication device and projects therefrom towards the contact surface.

BACKGROUND

Brake calipers of the aforementioned type are generally known in the art and typically employed in trucks or buses. The friction lining of such a brake caliper is configured to bear against a brake disc during braking, which in turn causes the friction lining to wear over time. To monitor the friction lining thickness, in particular to determine whether the thickness of the friction lining is below a predefined wear limit, it is known in the art to arrange a wear indication device proximate to the friction lining.

As the wear, i.e. consumption, of the friction lining caused by the rotation of the brake disc during braking progresses, at some point a distal portion of the wear indication device will commence to be worn off, i.e. consumed, as well. Due to that, the distal portion of the wear indication device facing towards the friction lining and/or the brake disc is formed by a material that does not damage the brake disc but withstands high temperatures that occur during braking.

A signal wire is typically integrated in the distal portion of the wear indication device that is subject to wear. Once the wire is ruptured by the rotation of the brake disc during braking, a voltage change is registered as a function of the rupture, indicating that the wear limit is reached. Only a residual amount of friction lining remains such that the vehicle can safely be taken to a maintenance station for brake pad replacement.

U.S. Pat. No. 3,675,197 shows a wear indication device of the aforementioned type that allows an appropriate wear indication and mounting of the wear indication device to the brake pad carrier. Said wear indication device includes a fixation means for fixating the signal wire. The fixation of the signal wire to the clip or brake pad basically relies on friction between the signal cable and the clip. Due to the friction-based fixation, it has been found that under certain conditions, the signal wire, in particular the looped portion of the signal wire, may loosen from the fixation means. When this occurs, the signal wire may rupture prematurely, i.e. earlier than intended, by the rotation of the brake disk during braking. In such case, a false or inaccurate indication is generated even before the actual wear limit is reached. This is highly unwanted. Furthermore, it has been observed that with known fixation means, signal wires have been erroneously assembled, for example too tight or too loose. When this happens, the overall accuracy of the wear limit indication is reduced.

SUMMARY

It was therefore an object of the present disclosure to provide a brake caliper that overcomes the above-mentioned issues as far as possible. In particular, it was an object of the present disclosure to provide a brake caliper having a wear indication device that allows a reliable and accurate monitoring and indication of the consumption of the friction lining. Further, it was an object of the present disclosure to simplify the mounting of the wear indication device to the brake pad carrier.

In accordance with the present disclosure, a hook is provided, wherein said hook is attached to the back part of the fixation device and wherein said hook engages with said looped portion.

The present disclosure advantageously provides that by providing a hook attached to the back part of the fixation device, the signal wire can be conveniently and securely mounted while the looped portion is properly tightened. In this way, the position of the looped portion and the signal wire as such is precisely determined and the looped portion is reliably kept in a defined position. Hence, the likelihood of false, i.e. too early, wear limit indications is reduced. Furthermore, the overall assembly process of the wear indication device is more repeatable and more mistake-proof.

According to a preferred embodiment, the hook includes a first portion extending from said back part, wherein said first portion is aligned substantially in parallel to said bridge. Preferably, the hook includes a second portion extending form the first portion, wherein said second portion is aligned substantially in parallel to the back part and extends towards said bridge. In this way, the looped portion of the signal wire is safely kept in a predefined position while the geometry of said hook supports a convenient assembly of the signal wire with the fixation device. With the help of the second portion, the looped portion is kept in place safely, even in the event of substantial vibrations that may occur during vehicle operation.

According to another preferred embodiment, the fixation device includes a cut-out located adjacent to said hook, in particular, wherein a geometry of said cut-out corresponds to a geometry of said hook. With the help of said cut-out, the overall weight of the fixation device is reduced, while, in addition, the available mounting space for the looped portion is increased in the proximity of the hook.

According to another preferred embodiment, said hook is formed integrally with said fixation device. In other words, the hook and fixation device are preferably manufactured as one-piece and in particular from the same material. In this way, the number of parts and the manufacturing complexity is reduced.

According to yet another preferred embodiment, said looped portion includes a loop protective sleeve arranged at said looped portion, wherein said loop protective sleeve protects the signal wire at a portion at which the signal wire contacts said hook. With the help of said loop protective sleeve, it is ensured that even when some minor relative movement between hook and the looped portion occurs, the contact portion of the signal wire is protected from excessive wear. Preferably, said signal wire includes a main protective sleeve, wherein said main protective sleeve abuts or presses against said hook to secure the position of the looped portion, and wherein said main protective sleeve overlaps with said loop protective sleeve.

According to another preferred embodiment, the fixation device includes a bar extending from the front part parallel to the carrier plane and wherein the bar is configured to engage the signal wire proximate to the carrier plane. Thus, the signal wire is secured at a position in a repeatable manner where it is proximate to the carrier plane and the contact surface, such that the signal wire will face towards and come into contact with the brake disc, where it will be ruptured when the predefined wear limit is reached. Preferably, the bar extends at a distance and parallel to the carrier plane. The bar is preferably straight, but may also be partially or completely curved.

According to a preferred embodiment, the brake pad carrier has a recess, in particular a through-hole, wherein said recess extends from the carrier plane to the rear plane, and wherein the signal wire is led therethrough. Thus, a secure and reliable guidance of the signal wire through the brake pad carrier is achieved. Preferably, the looped portion of the signal wire is at least partially looped around the bar, extends through the recess, and is looped around the hook. In this way, the signal wire is safely secured to the fixation device in a repeatable manner.

According to another preferred embodiment, the fixation device has a recess configured to guide the signal wire, wherein the recess at least partially overlaps the recess of the brake pad carrier, and a back end portion of the signal wire is led through both recesses. Thus, the signal wire and, in particular, its back end, can be guided from the rear plane to a connector which can be used to connect the wear indication device to a control unit of a vehicle.

It is further preferred that the fixation device has a positioning member that engages a circumferential surface of the through-hole, thereby arranging the fixation device at a predefined position with respect to the through-hole. Thus, the fixation device is secured parallel to the carrier plane by the positioning member and, additionally, orthogonal to the carrier plane by the clamping force acting on the carrier plane and the rear plane, respectively. Such a positioning member securely arranges the fixation device with respect to the through-hole and at the same time provides a repeatable positioning of the signal wire which ensures a safe detection of the wear limit.

Preferably, the bridge is configured to rest against an upper surface of the brake pad carrier. Thereby, the fixation device can be coupled to the brake pad carrier by pushing the fixation device from the upper surface of the brake pad carrier along the carrier plane and rear plane into its final position. Thus, the final position of the fixation device with respect to the carrier plane is advantageously secured by the bridge that rests against an upper surface of the brake pad carrier.

In a second aspect, the present disclosure also relates to a wear indication device for a brake caliper, in particular a brake caliper according to any of the preceding embodiments, wherein the brake caliper includes a brake pad, the brake pad having a friction lining and a brake pad carrier configured to carry the friction lining proximate to a brake disc of the vehicle brake, and wherein the friction lining has a contact surface facing away from the brake pad carrier that is configured to bear against the brake disc of the vehicle brake during braking, and a wear indication device having a fixation device and a signal wire including a looped portion, wherein the fixation device has a front part engaging the carrier plane, a back part engaging the rear plane, and a bridge connecting the front part and the back part, wherein the looped portion of the signal wire is at least partially arranged externally of the front part of the wear indication device and projects therefrom towards a contact surface.

According to the second aspect, the present disclosure achieves the initially mentioned object by providing a hook that is attached to the back part of the fixation device, wherein said hook is engages with said looped portion.

The embodiments and benefits of the brake caliper according to the first aspect are at the same time preferred embodiments and benefits of the wear indication device according to the second aspect and vice versa. To avoid unnecessary repetitions, reference is thus made to the description herein above.

In a third aspect, the present disclosure also relates to a vehicle brake, in particular a disc brake of a commercial vehicle, the vehicle brake including a brake disc and a brake caliper, in particular a brake caliper according to any of the previous embodiments, forming an accommodation space for the brake disc, the brake caliper including a brake pad having a friction lining and a brake pad carrier configured to carry the friction lining proximate to a brake disc of the vehicle brake, wherein the friction lining has a contact surface facing away from the brake pad carrier that is configured to bear against the brake disc of the vehicle brake during braking, and a wear indication device having a fixation device and a signal wire including a looped portion, wherein the fixation device has a front part engaging the carrier plane, a back part engaging the rear plane, and a bridge connecting the front part and the back part, wherein the looped portion of the signal wire is at least partially arranged externally on the front part of the wear indication device and projects therefrom towards the contact surface.

According to the third aspect, the present disclosure achieves the initially mentioned objects by providing a hook that is attached to the back part of the fixation device, wherein said hook is engages with said looped portion.

The embodiments and benefits of the brake caliper according to the first aspect are at the same time preferred embodiments and benefits of the vehicle brake according to the third aspect and vice versa. To avoid unnecessary repetition, reference is made to the description herein above.

For a more complete understanding of the present disclosure, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the present disclosure may not be limited to the exact form and detail shown and described herein, nor to anything less than the whole of the invention disclosed herein and as claimed hereinafter. Further, the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

BRIEF DESCRIPTION OF THE DRAWINGS

These and other aspects, features and/or technical effects will be apparent from and elucidated with reference to the illustrations described hereinafter, in which.

DETAILED DESCRIPTION

Figure 1:
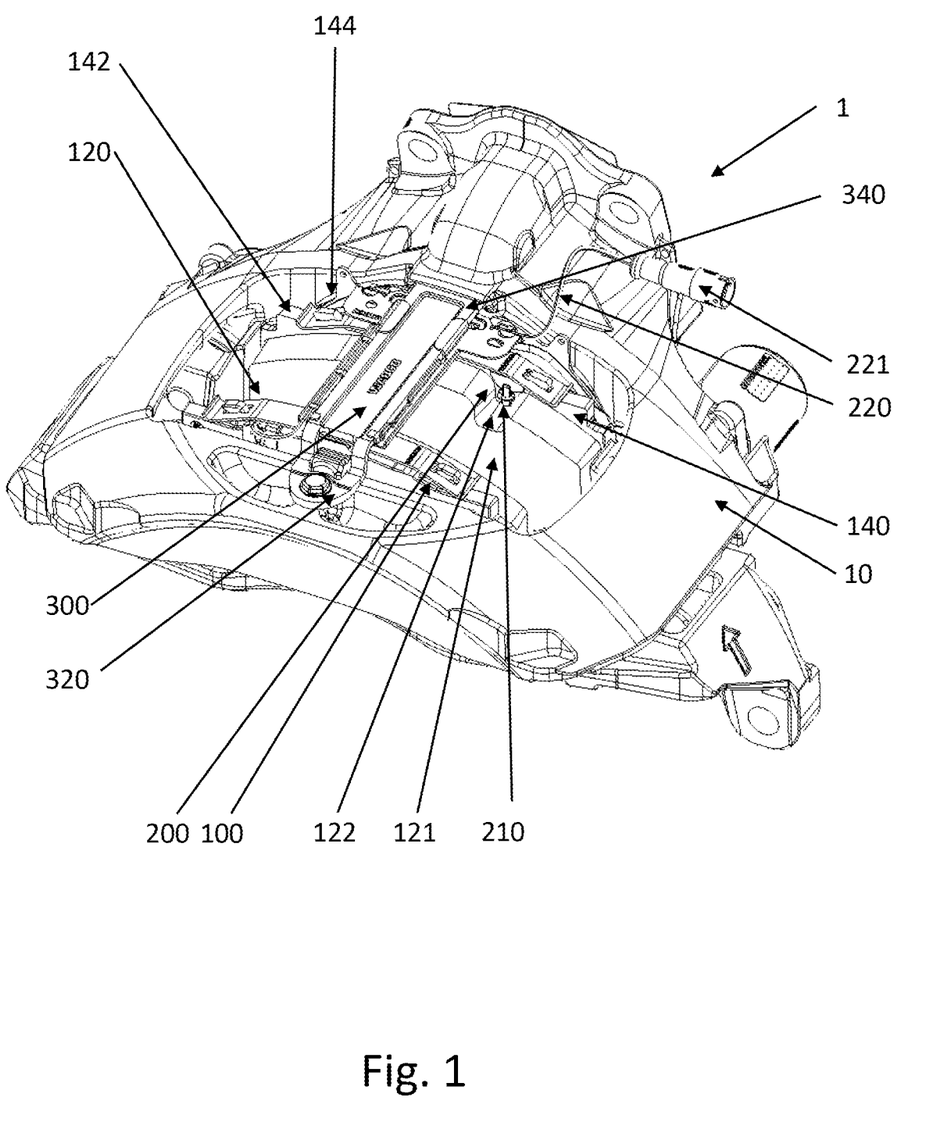
FIG. 1 is a perspective view of aa disc brake according to an embodiment of the present disclosure.

FIG. 1 shows a disc brake 1 that includes a brake caliper 10, forming an accommodation space for, among others, brake pads 100. Each brake pad 100 includes a brake pad carrier 140, each having and a friction lining 120 that comes into contact with the disc of the brake (not shown) during braking in order to apply a braking force.

The brake pad carrier 140 extends completely over the inner surface of the brake caliper 10 and projects beyond the upper periphery of the brake caliper 10. Each of the brake pad carriers 140 has a carrier plane 142, which is configured to carry one of the friction linings 120. The friction lining 120 has a contact surface 121 facing away from the brake pad carrier 140, which is configured to bear against the brake disc of the vehicle brake 1 during braking. The brake pad carrier 140 further has a rear plane 144 opposite to the carrier plane 142.

Further, the brake pad carrier 140 has a wear indication device 200 which is configured to assess the degree of wear of the friction lining 120. The wear indication device 200 is coupled to the brake pad carrier 140 and at least partly received in a recess (see FIG. 2) of the brake pad carrier 140. Each of the frictions linings 120 has a cut-out 122 surrounding the recess such that the recess is arranged within the region of the cut-out 122. Thus, the wear indication device 200 is surrounded by the friction lining 120 wherein the cut-out 122 allows an easy access to the wear indication device 200 without requiring demounting of the brake pads 100.

The two brake pad carriers 140 each carrying one of the friction linings 120 are held in position by a spring hanger 300. The spring hanger 300 is preferably connected to the brake caliper 10 by a spring hanger seat 340 on one side and by a spring hanger fixation mechanism 320 on the other side. After releasing the spring hanger fixation mechanism 320 and guiding the spring hanger 300 out of its seat 340, the spring hanger 300 may be removed. When the spring hanger 300 is removed, the brake pads 100 may be removed likewise and be exchanged. The wear indication device 200 has a fixation device 210 and a signal wire 220 including a connector 221 at its distal end.

Figure 2:
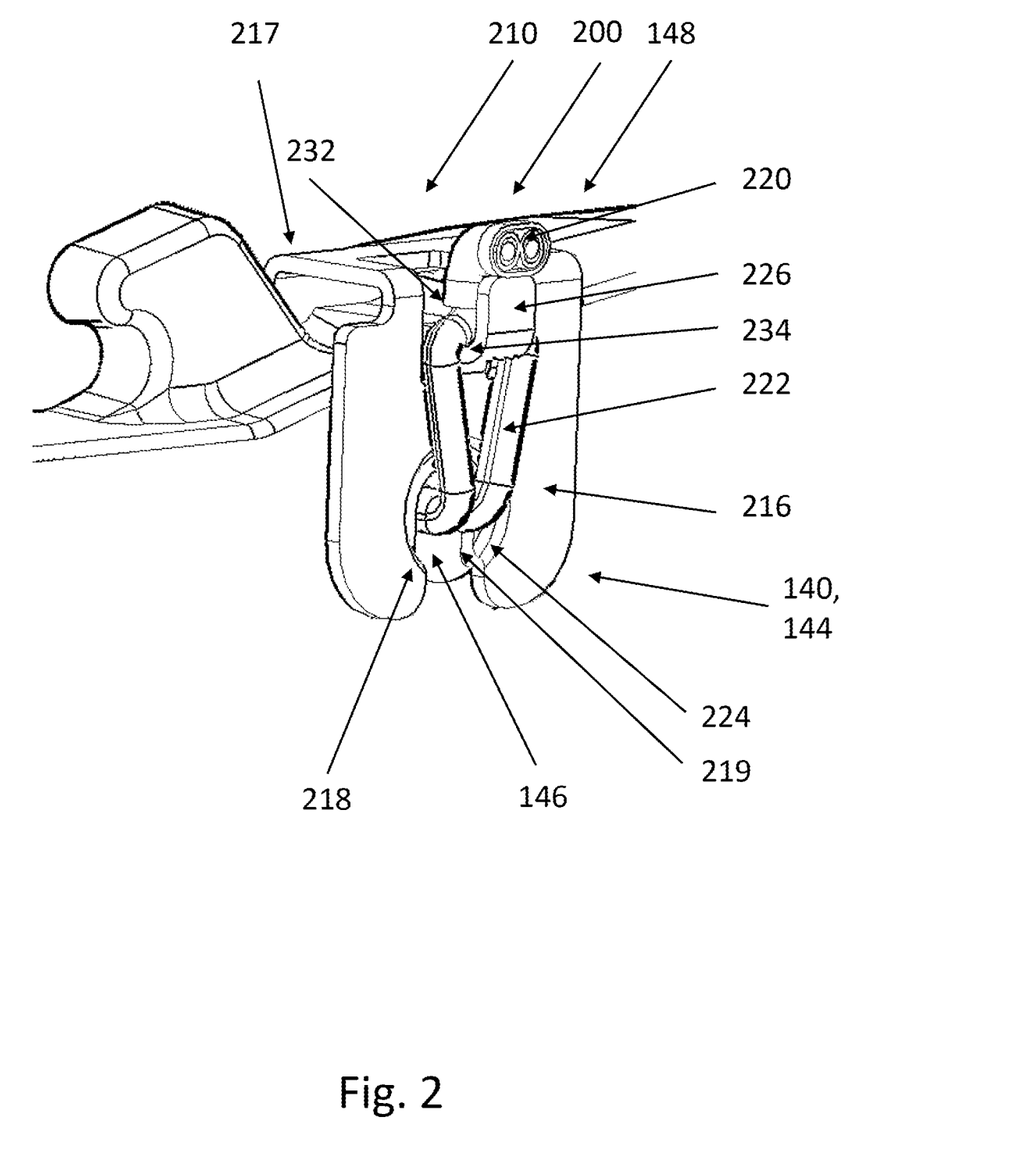
FIG. 2 is a perspective view of an embodiment of a wear indication device according to the present disclosure assembled to a brake pad carrier.
Figure 3:
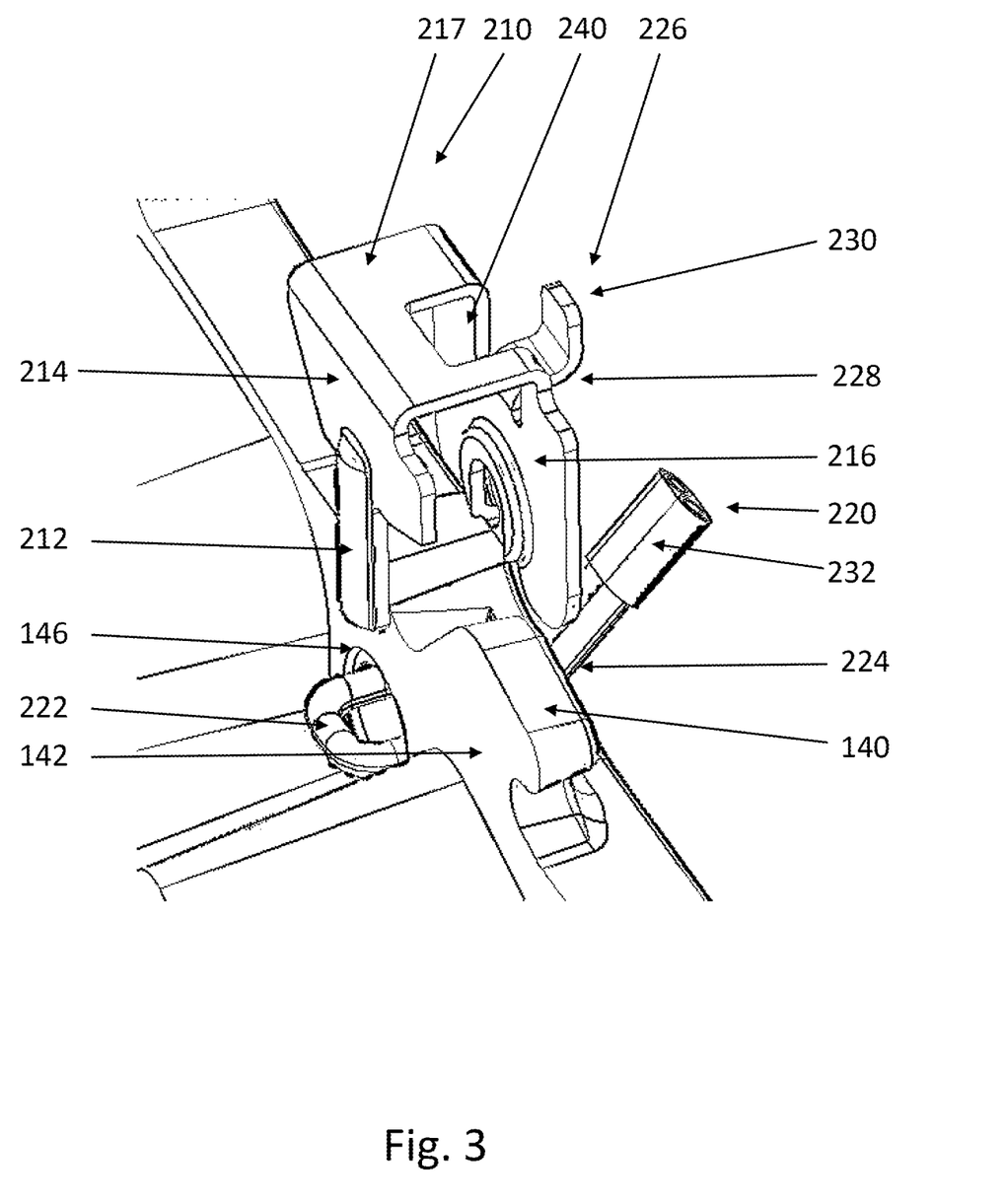
FIG. 3 is a perspective view of the embodiment of the wear indication device according to FIG. 2 in a mounting state.
Figure 4:
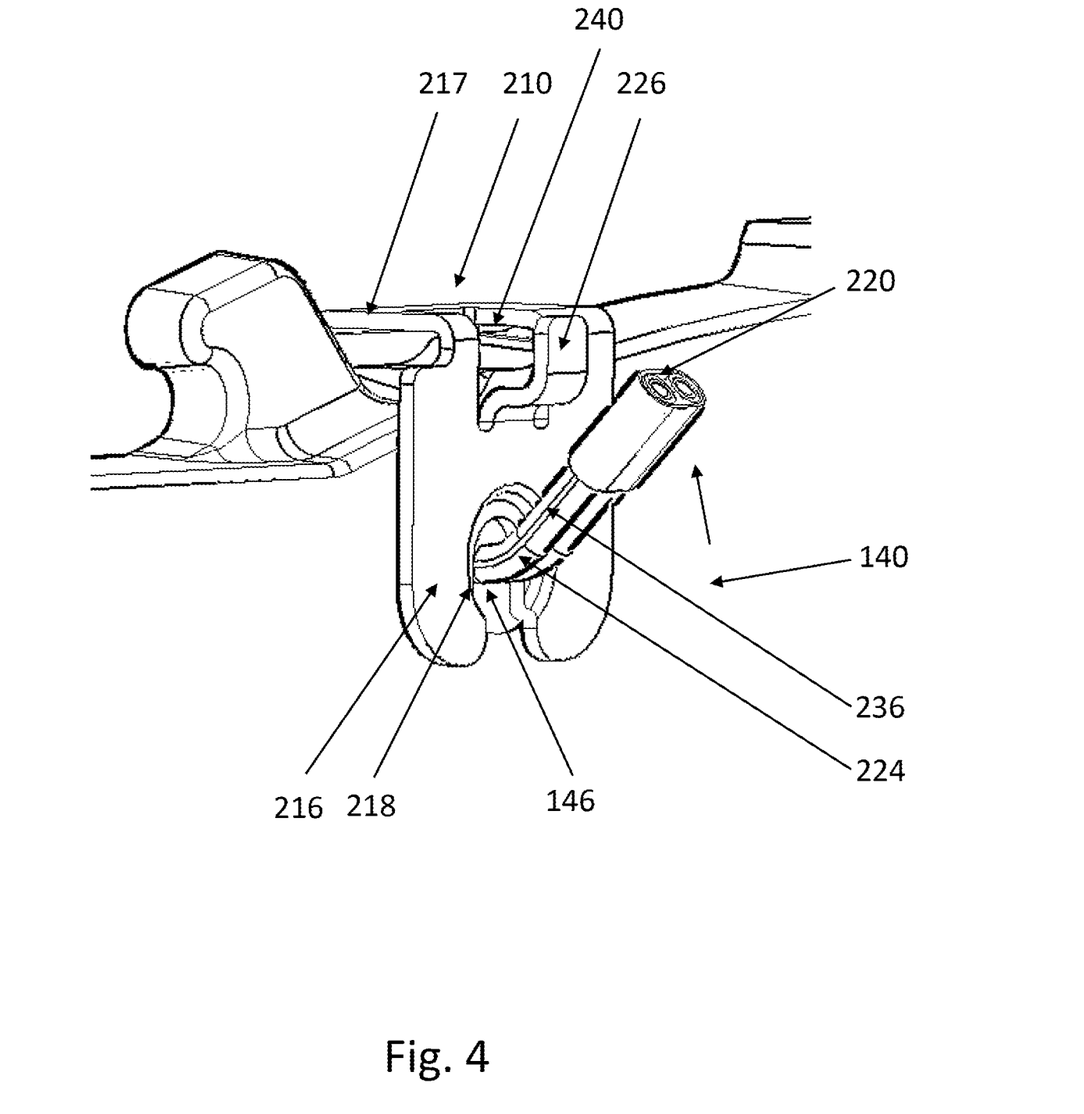
FIG. 4 is a perspective view of the embodiment of the wear indication device according to FIG. 2 in another mounting state.

FIG. 2 details the wear indication device 200. In FIG. 2, said wear indication device 200 is shown in an assembled state. FIGS. 3 and 4 illustrate the different assembly steps. Subsequently, different parts of the wear indication device 200 will be explained with reference to FIGS. 2 to 4.

The wear indication device 200 includes a fixation device 210 and a signal wire 220. The signal wire 220 includes a looped portion 222. The fixation device 210 has a front part 214 engaging the carrier plane 142. The fixation device 210 furthermore includes a back part 216 engaging the rear plane 144. The fixation device 210 furthermore includes a bridge 217 which connects the front part 214 to the back part 216. The looped portion 222 of the signal wire 220 is at least partially arranged externally on the front part 214 of the wear indication device 200. The looped portion 222 projects therefrom towards the contact surface 121.

The fixation device 210 includes a hook 226. The hook 226 is attached to the back part 216 of the fixation device 210. The hook 226 is configured for engaging with said looped portion 222. The hook 226 includes a first portion 228. The first portion extends from the back part 216 and is aligned substantially in parallel to said bridge 217. The hook 226 further includes a second portion 230 that extends from the first portion 228. The second portion 230 is aligned substantially in parallel to the back part 216 and extends towards said bridge 217.

The fixation device 210 includes a cut-out 240. The cut-out 240 is located adjacent to the hook 226. A geometry of the cut-out 240 corresponds to a geometry of the hook 226.

The hook 226 is formed integrally with the fixation device 210. The signal wire 220 includes a main protective sleeve 232. The main protective sleeve 232 is arranged adjacent to the looped portion 222. The main protective sleeve 232 is configured to be pressed or abutted against the hook 226 to secure the position of looped portion 222. The looped portion 222 includes a loop protective sleeve 236 for protecting the signal wire 220 at a contact portion 234 (FIG. 2) at which the signal wire 220 contacts the hook 226.

The fixation device 210 comprises a bar 212. The bar 212 extends from the front part 214 and in parallel to the carrier plane 142. The bar 212 is configured to engage the signal wire 220 proximate to the carrier plane 142. The brake pad carrier 140 has a recess 146, which is configured as a through-hole 146. The recess 146 extends from the carrier plane 142 to the rear plane 144. The signal wire 220, in particular the looped portion 222, is led through the recess 146. The looped portion 222 of the signal wire 220 is at least partially looped around the bar 212. The looped portion 222 extends through the recess 146 and is looped around the hook 226 in the assembled state, which is shown in FIG. 2.

The fixation device 210 has a recess 218. The recess 218 is configured to guide the signal wire 220, wherein the recess 218 at least partially overlaps the recess 146 of the brake pad carrier 140. A back end portion 224 of the signal wire 220 is led through both recesses 146, 218. The fixation device 210 further has a positioning member 219 configured to engage a circumferential surface of the through-hole 146. Thereby, the fixation device 210 is arranged at a predefined position with respect to the through-hole 146. The bridge 217 is configured to rest against an upper surface 148 of the brake pad carrier 140.

In FIG. 2, the wear indication device 220 is shown in an assembled state at which the fixation device 210 engages the brake pad carrier 140 and wherein the looped portion 222 of the signal wire 220 is looped around the bar 212, extends through the recess 146 and is also looped around the hook 226 in order to secure the position of the signal wire 220 with respect to the brake pad carrier 140.

FIG. 3 shows an initial assembly step at which the looped portion 222 is guided through the recess 146 of the brake pad carrier 140 such that the looped portion 222 extends through the recess 146. Thereafter, fixation device 210 is lowered towards the brake pad carrier 140 such that the bar 212 engages the looped portion 222. As shown in FIG. 4, the back end 224 of the looped portion 222 is furthermore guided through the recess 218 of the wear indication device 200. As a final step, indicated with the arrow in FIG. 4, the back end 224 of the looped portion 222 is put over the hook 226 in order to safely secure the signal wire 220 as shown in FIG. 2.

Figure 5:
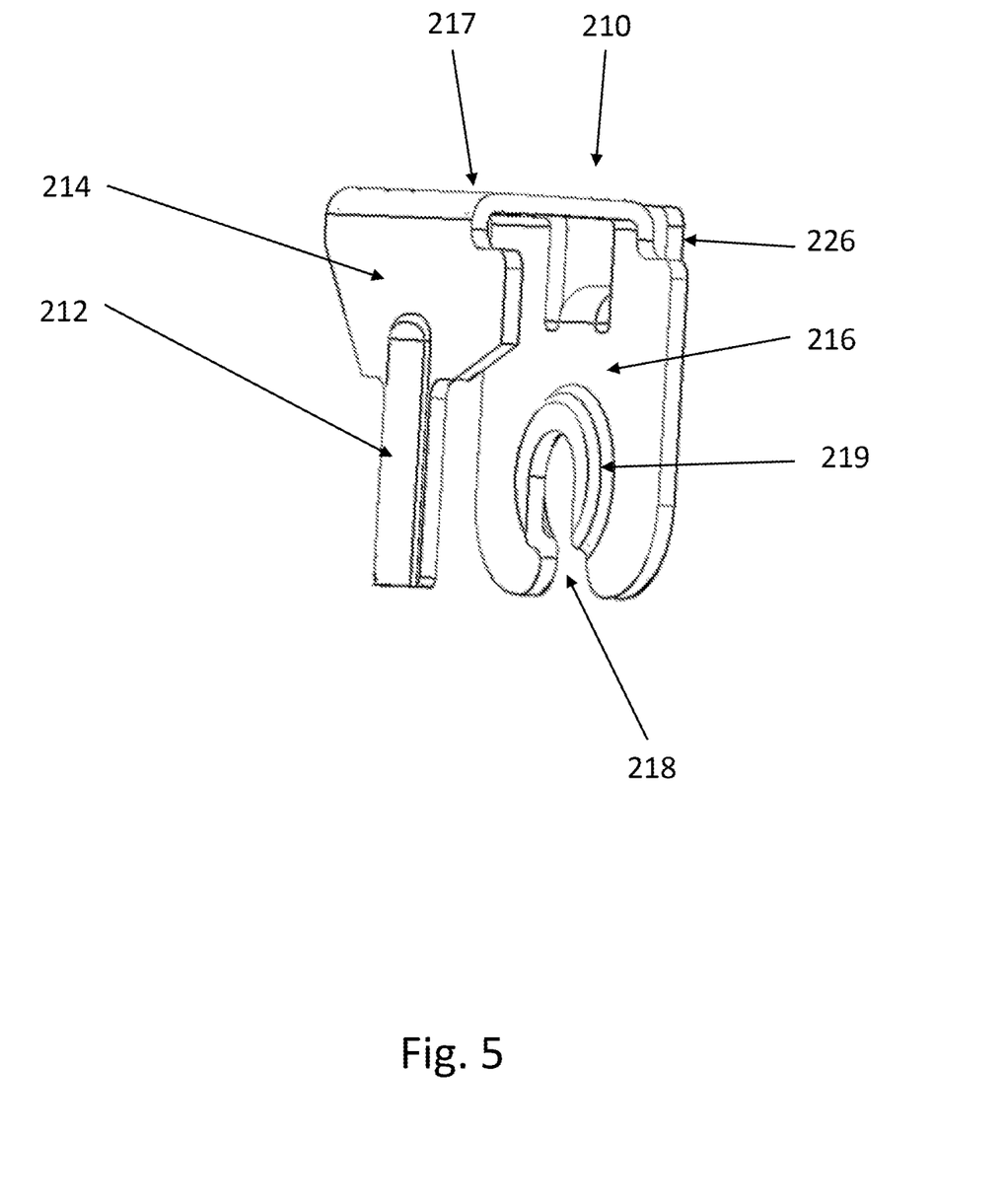
FIG. 5 is a perspective view of an embodiment of the fixation device.
Figure 6:
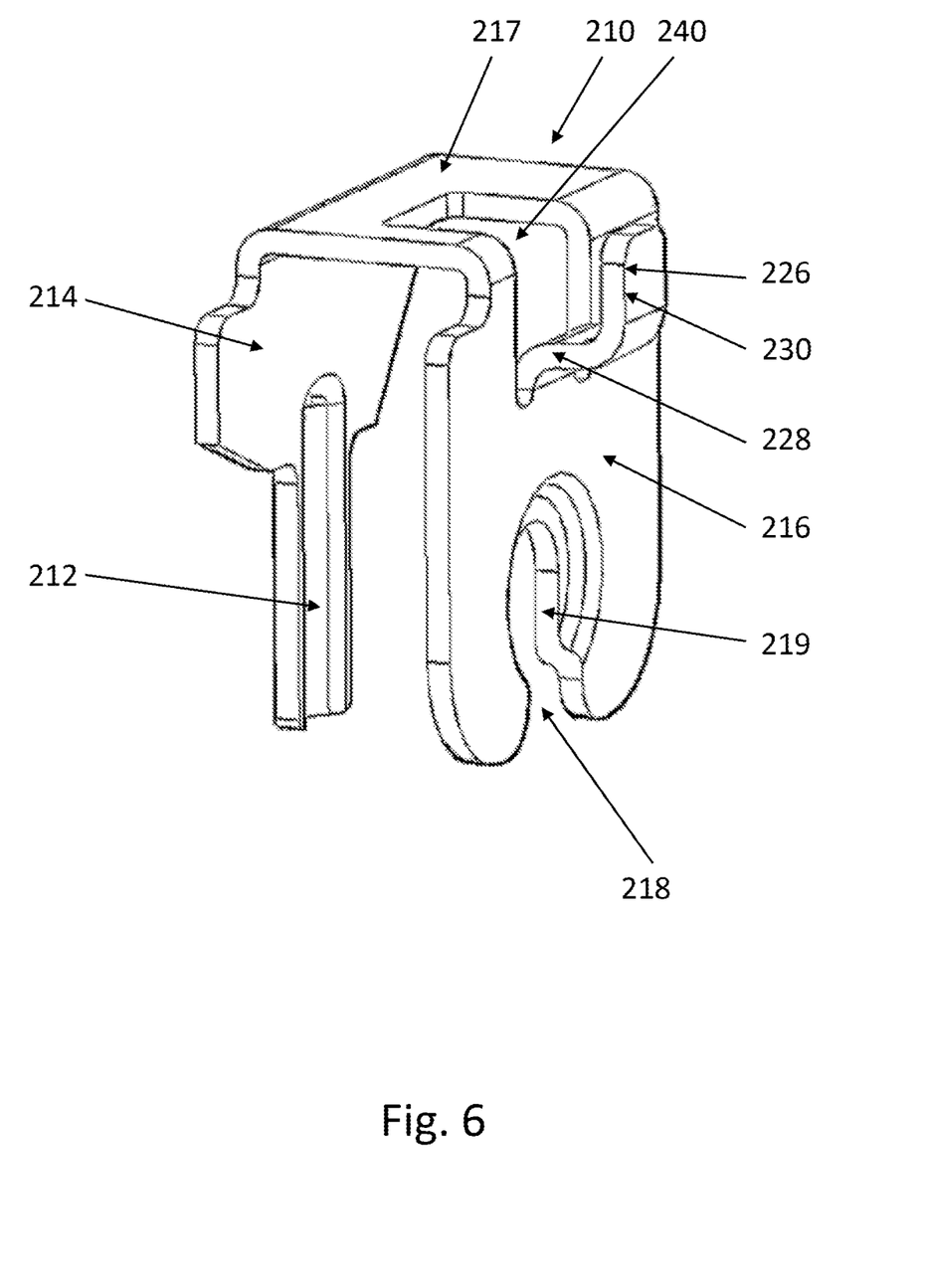
FIG. 6 is another perspective view of the embodiment of the fixation device.

FIGS. 5 and 6 show an embodiment of the fixation device 210 in perspective views. With regard to a more detailed description, reference is made to the corresponding description of FIGS. 2 to 4.

Figure 7:
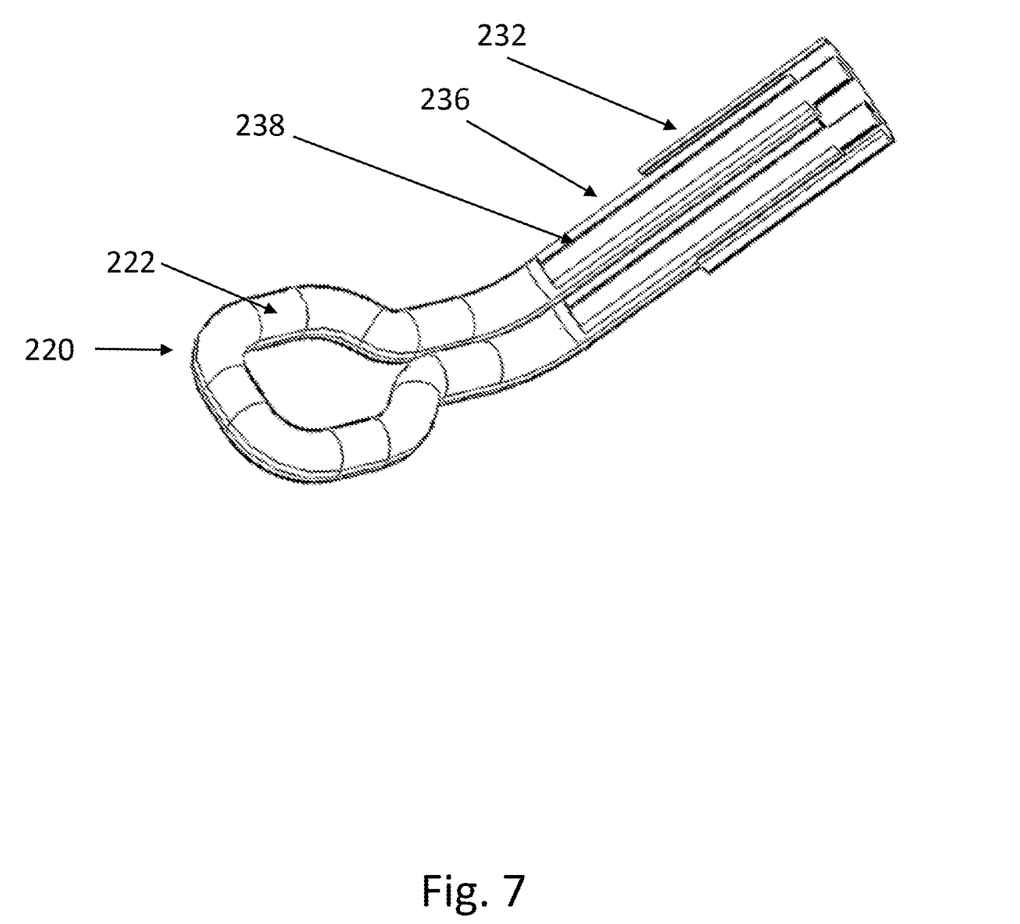
FIG. 7 is a partial sectional view of an embodiment of a signal wire according to the present disclosure.

FIG. 7 shows an embodiment of a signal wire 220. The signal wire 220 includes looped portion 222 at which a loop protective sleeve 236 surrounds the leads 238 of the signal wire 220. The signal wire 220 furthermore comprises the main protective sleeve 232, which is arranged adjacent to the looped portion 222. The loop protective sleeve 236 is configured for protecting the signal wire 220 at a contact portion 234 (see FIG. 2) at which the signal wire 220 contacts the hook 226 (see previous figures). The main protective sleeve 232 overlaps the loop protective sleeve 236.

LIST OF REFERENCE SIGNS (PART OF THE DESCRIPTION)

1 disk brake
10 brake caliper
100 brake pad
120 friction lining
121 contact surface
122 cut-out
140 brake pad carrier
142 carrier plane
144 rear plane
146 recess, brake pad carrier
200 wear indication device
210 fixation device
212 bar
214 front part
216 back part
217 bridge
218 recess, wear indication device
219 positioning member
220 signal wire
221 connector
222 looped portion
224 back end
226 hook
228 first hook portion
230 second hook portion
232 main protective sleeve
234 contact portion of signal wire
236 loop protective sleeve
238 lead
240 cut-out
300 spring hanger
320 hanger fixation mechanism
340 hanger seat

The invention claimed is:

1. A brake caliper (10) for a vehicle brake (1), the brake caliper (10) comprising:
a brake pad (100) having a friction lining (120) and a brake pad carrier (140), the brake pad carrier (140) configured to carry the friction lining (120) proximate to a brake disc of the vehicle brake (1),
wherein the friction lining (120) has a contact surface (121) facing away from the brake pad carrier (140), the contact surface configured to bear against the brake disc of the vehicle brake (1) during braking,
wherein the brake pad carrier (140) has a carrier plane (142) facing towards the friction lining (120) and a rear plane (144) opposite to the carrier plane (142), and a wear indication device (200) including a fixation device (210) and a signal wire (220) having a looped portion (222),
wherein the fixation device (210) has a front part (214) engaging the carrier plane (142), a back part (216) engaging the rear plane (144), and a bridge (217) connecting the front part (214) and the back part (216),
wherein the looped portion (222) of the signal wire (220) is at least partly arranged externally on the front part (214) of the wear indication device (200) and projects from the front part (214) toward the contact surface (121) of the friction lining (120),
wherein a hook (226) extends from the back part (216) of the fixation device (210), said hook (226) engaging with said looped portion (222);
wherein the looped portion (222) of the signal wire (220) projects from a front-most surface of the fixation device (210);
wherein the fixation device (210) is a one-piece structure including at least the front part (214), the bridge (217), the back part (216), and the hook (226).

2. The brake caliper (10) according to claim 1, wherein the hook (226) includes a first portion (228) extending from said back part (216), and wherein said first portion (228) is aligned substantially in parallel to said bridge (217).

3. The brake caliper (10) according to claim 2, wherein the hook (226) includes a second portion (230) extending from the first portion (228), and wherein said second portion (230) is aligned substantially in parallel to the back part (216) and extends towards said bridge (217).

4. The brake caliper (10) according to claim 1, wherein the fixation device (210) includes a cut-out (240) located adjacent to said hook (226), wherein a geometry of said cut-out (240) corresponds to a geometry of said hook (226).

5. The brake caliper (10) according to claim 1, wherein said hook (226) is formed integrally with said fixation device (210).

6. The brake caliper (10) according to claim 1, wherein said signal wire (220) includes a loop protective sleeve (236) arranged at said looped portion (222), wherein said loop protective sleeve (236) protects the signal wire (220) at a contact portion (234) of the signal wire (220) that contacts said hook (226).

7. The brake caliper (10) according to claim 6, wherein said signal wire (220) includes a main protective sleeve (232), wherein said main protective sleeve (232) abuts against said hook (226), and wherein said main protective sleeve (232) overlaps with said loop protective sleeve (236).

8. The brake caliper (10) according to claim 1, wherein the fixation device (210) includes a bar (212) extending from the front part (214) parallel to the carrier plane (142), wherein the bar (212) engages the signal wire (220) proximate to the carrier plane (142).

9. The brake caliper (10) according to claim 8, wherein the brake pad carrier (140) has a recess (146) defining a through-hole (146), wherein said recess (146) extends from the carrier plane (142) to the rear plane (144), and wherein the signal wire (220) extends through the brake pad carrier (140) through the recess (146).

10. The brake caliper (10) according to claim 9, wherein the looped portion (222) of the signal wire (220) at least partially loops around the bar (212), extends through the recess (146), and at least partially loops around the hook (226).

11. The brake caliper (10) according to claim 9, wherein the fixation device (210) has a recess (218) configured to guide the signal wire (220), wherein the recess (218) of the fixation device (210) at least partly overlaps the recess (146) of the brake pad carrier (140), and a back end portion (224) of the signal wire (220) extends through both the recess (146) of the brake pad carrier (140) and the recess (218) of the fixation device (210).

12. The brake caliper (10) according to claim 9, wherein the fixation device (210) has a positioning member (219) that engages a circumferential surface of the through-hole defined by the recess (146) thereby arranging the fixation device (210) at a predefined position with respect to the through-hole defined by the recess (146).

13. The brake caliper (10) according to claim 1, wherein the bridge (217) rests against an upper surface (148) of the brake pad carrier (140).

14. A wear indication device (200) for a brake caliper (10) comprising:
a fixation device (210) configured to engage a brake pad carrier (140) that has a carrier plane (142) for carrying a friction lining (120) and a rear plane (144) opposite the carrier plane (142), and
a signal wire (220) having a looped portion (222),
wherein the fixation device (210) has a front part (214) for engaging the carrier plane (142), a back part (216) engaging the rear plane (144), and a bridge (217) connecting the front part (214) and the back part (216),
wherein the looped portion (222) of the signal wire (220) is at least partly arranged externally on the front part (214) of the wear indication device (200) configured to project toward a contact surface (121) of,
wherein a hook (226) extends from the back part (216) of the fixation device (210), said hook (226) engaging with said looped portion (222);
wherein the hook (226) includes a first portion (228) extending from said back part (216), and wherein said first portion (228) is aligned substantially in parallel to said bridge (217), wherein the hook (226) includes a second portion (230) extending from the first portion (228), and wherein said second portion (230) is aligned substantially in parallel to the back part (216) and extends towards said bridge (217).

15. The wear indication device according to claim 14, wherein the fixation device (210) includes a bar (212) extending from the front part (214) parallel to the back part (216), wherein the bar (212) engages the looped portion (222) of the signal wire (220).

16. The wear indication device according to claim 15, wherein the fixation device (210) has a recess (218) in the back part (216) configured to guide the signal wire (220), wherein the recess (218) of the fixation device (210) is configured to at least partly overlaps a through-hole of the brake pad carrier (140), and a back end portion (224) of the signal wire (220) extends through the recess (218) of the fixation device (210).

17. The wear indication device according to claim 16, wherein the looped portion (222) of the signal wire (220) at least partially loops around the bar (212), extends through the recess (218) of the fixation device (210), and at least partially loops around the hook (226).

18. A vehicle brake (1) comprising:
a brake disc, and
a brake caliper (10) forming an accommodation space for the brake disc, the brake caliper comprising:
a brake pad (100) having a friction lining (120) and a brake pad carrier (140) carrying the friction lining (120) proximate to the brake disc, wherein the brake pad carrier (140) has a carrier plane (142) for carrying the friction lining (120) and a rear plane (144) opposite the carrier plane (142);
wherein the friction lining (120) has a contact surface (121) facing away from the brake pad carrier (140) that bears against the brake disc during braking, and
a wear indication device (200) having a fixation device (210) and a signal wire (220) including a looped portion (222),
wherein the fixation device (210) has a front part (214) engaging the carrier plane (142), a back part (216) engaging the rear plane (144), and a bridge (217) connecting the front part (214) and the back part (216),
wherein the looped portion (222) of the signal wire (220) is at least partly arranged externally on the front part (214) of the wear indication device (200) and projects toward the contact surface (121),
wherein a hook (226) extends from the back part (216) of the fixation device (210), said hook (226) engaging with said looped portion (222);
wherein the fixation device (210) includes a bar (212) extending from the front part (214) parallel to the carrier plane (142), wherein the bar (212) engages the signal wire (220) proximate to the carrier plane (142),
wherein the fixation device (210) has a recess (218) in the back part (216) configured to guide the signal wire (220), wherein the recess (218) of the fixation device (210) at least partly overlaps a recess (146) defining a through-hole through the brake pad carrier (140),
wherein the looped portion (222) of the signal wire (220) at least partially loops around the bar (212) and extends through the recess (146) of the brake pad carrier (140) device (210), and a back end portion (224) of the signal wire (220) extends through the recess (218) of the fixation device (210) and at least partially loops around the hook (226).

\* \* \* \* \*